(12) United States Patent
Hojjatie et al.

(10) Patent No.: US 7,494,525 B2
(45) Date of Patent: Feb. 24, 2009

(54) CALCIUM POLYSULFIDE, POTASSIUM POLYSULFIDE, CALCIUM THIOSULFATE, AND MAGNESIUM THIOSULFATE AS UREASE INHIBITORS

(75) Inventors: Michael Massoud Hojjatie, Tucson, AZ (US); John Garland Clapp, Greensboro, NC (US); Thomas David Fairweather, Dunbee, OR (US); Constance Lynn Frank Lockhart, Tucson, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 674 days.

(21) Appl. No.: 11/061,508

(22) Filed: Feb. 22, 2005

(65) Prior Publication Data

US 2006/0185411 A1   Aug. 24, 2006

(51) Int. Cl.
  *C05C 9/00* (2006.01)
(52) U.S. Cl. .......................................... 71/28; 71/64.1
(58) Field of Classification Search ................ 71/11–30, 71/64.1
  See application file for complete search history.

(56) References Cited

U.S. PATENT DOCUMENTS

| | | | |
|---|---|---|---|
| 3,290,353 A | 12/1966 | Battershell et al. |
| 4,242,325 A | 12/1980 | Bayless et al. |
| 4,243,563 A | 1/1981 | Ferm |
| 4,462,819 A | 7/1984 | Van Der Puy et al. |
| 4,481,308 A | 11/1984 | Gray |
| 4,517,002 A | 5/1985 | Anello et al. |
| 4,517,003 A | 5/1985 | Kolc et al. |
| 4,517,004 A | 5/1985 | Swerdloff et al. |
| 4,517,007 A | 5/1985 | Swerdloff et al. |
| 4,518,413 A | 5/1985 | Swerdloff et al. |
| 4,530,714 A | 7/1985 | Kolc et al. |
| 4,537,614 A | 8/1985 | van der Puy et al. |
| 4,539,037 A | 9/1985 | Swerdloff et al. |
| 4,540,428 A | 9/1985 | van der Puy et al. |
| 4,618,691 A | 10/1986 | Medina et al. |
| 4,624,695 A | 11/1986 | Swerdloff et al. |
| 4,629,491 A | 12/1986 | Swerdloff et al. |
| 4,676,821 A | 6/1987 | Gullett et al. |
| 4,676,822 A | 6/1987 | Gautney |
| 4,696,693 A | 9/1987 | Swerdloff et al. |
| 4,824,783 A | 4/1989 | Swerdloff et al. |
| 4,932,991 A | 6/1990 | Radel et al. |
| 4,932,992 A | 6/1990 | Radel |
| 4,954,156 A | 9/1990 | Gautney et al. |
| H1085 H | 8/1992 | Simmons et al. |
| 5,261,939 A * | 11/1993 | Solansky et al. ............... 71/29 |
| 5,300,135 A | 4/1994 | Hudson et al. |
| 5,423,897 A | 6/1995 | Hudson et al. |
| 5,435,821 A | 7/1995 | Duvdevani et al. |
| 5,478,375 A | 12/1995 | Hudson |
| 5,599,374 A | 2/1997 | Detrick |
| 5,653,782 A | 8/1997 | Stern et al. |
| 5,698,003 A | 12/1997 | Omilinsky et al. |
| 5,883,297 A | 3/1999 | Sulzer et al. |
| 6,262,183 B1 | 7/2001 | Domb et al. |
| 6,315,807 B1 | 11/2001 | Patra et al. |
| 6,475,259 B1 | 11/2002 | Thomas et al. |

FOREIGN PATENT DOCUMENTS

| | | |
|---|---|---|
| EP | 0 119 487 | 9/1984 |
| EP | 0 119 494 | 9/1984 |
| EP | 0 119 495 | 9/1984 |
| EP | 0 476 550 | 2/1995 |
| EP | 1 070 691 | 12/2003 |
| GB | 2 164 640 | 3/1986 |
| GB | 0 356 755 | 3/1990 |
| GB | 2 285 803 | 7/1995 |
| JP | 59-151900 | 8/1984 |
| JP | 11-000165 | 1/1999 |
| WO | WO 89/03811 | 5/1989 |
| WO | WO 97/04819 | 2/1997 |
| WO | WO 97/22568 | 6/1997 |
| WO | WO 00/58317 | 10/2000 |
| WO | WO 00/61522 | 10/2000 |
| WO | WO 02/83697 | 10/2002 |
| WO | WO 02/90294 | 11/2002 |

OTHER PUBLICATIONS

R. J. Goos et al, "Effect of ammonium thiosulfate and liquid fertilizer droplet size on urea hydrolysis", Soil Science Society of America Journal, 52(2), 522-4, 1988, no month.*
Kissel, et al., "Ammonia Volatilization From Urea and Urea/Thio-Sul Mixtures with Soil", Department of Crop and Soil Sciences, University of Georgia, Oct. 1, 1999; pp. 1-24.
Fenn, et al., "Ammonia Volatilization from Surface Applications of Ammonium Compounds on Calcareous Soils: I. General Theory", Soil Sci. Soc. Amer. Proc., vol. 37, (1973); pp. 855-859.
Fenn, et al., "Substitution of Ammonium and Potassium for Added Calcium in Reduction of Ammonia Loss from Surface-Applied Urea", Soil Sci. Soc. Am. J., vol. 46, (1982); pp. 773-776.
Fenn, et al., "Ammonia Losses from Surface-Applied Nitrogen Fertilizer as Controlled by Soluble Calcium and Magnesium: General Theory", Soil. Sci. Soc. Am. J., vol. 45, (1981): pp. 777-781.
Fenn, et al., "Soil Cation Exchange Capacity Effects on Ammonia Loss from Surface-Applied Urea in the Presence of Soluble Calcium", Soil Sci. Soc. Am. J., vol. 46, (1982): pp. 79-81.
Sloan, et al., "Influence of Calcium Chloride and Ammonium Thiosulfate on Bermudagrass Uptake of Urea Nitrogen", Commun. Soil Sci. Plant Anal. vol. 29, (1998): pp. 435-455.
Fenn, et al., "A Comparison of Calcium Carbonate Recipitation and pH Depression on Calcium-Reduced Ammonia Loss from Surface-Applied Urea", Soil Sci. Am. J., vol. 45, (1981): pp. 1128-1131.
Goos, "Identification of Ammonium Thiosulfate as a Nitrification and Urease Inhibitor", Soil Sci. Soc. Am. J., vol. 49, (1985): pp. 232-235.

(Continued)

*Primary Examiner*—Wayne Langel
(74) *Attorney, Agent, or Firm*—Fennemore Craig, P.C.

(57) ABSTRACT

Use of urease-inhibiting amounts of calcium polysulfide, potassium polysulfide, calcium thiosulfate, magnesium thiosulfate, and blends thereof, in combination with urea-containing fertilizer to significantly reduce potential losses of nitrogen due to ammonia volatilization.

20 Claims, No Drawings

OTHER PUBLICATIONS

He, et al., "Ammonia Volatilization from Different Fertilizer Sources and Effects of Temperature and Soil pH[1]", Soil Science, vol. 164, Oct. 1999: pp. 750-758.

Fenn, et al., "Ammonia Loss and Associated Reactions of Urea in Calcareous Soils", Soil Sci. Soc. Am. J., vol. 45, (1981): pp. 537-540.

Bock, et al., "Ammonia Volatilization From Urea Fertilizers," National Fertilizer Development Center 1988, pp. 137-174.

Sullivan, et al., "Thiosulfate Inhibition of Urea Hydrolysis in Soils: Tetrathionate as a Urease Inhibitor", Soil Sci. Soc. Am. J., vol. 56, May-Jun. 1992: pp. 957-960.

Goos, et al., "Ammonium Thiosulfate as a Urease Inhibitor", British Library—The world's knowledge—www.bl.uk.

Karplus, et al., "70 Years of Crystalline Urease: What have We Learned?", Acc. Chem. Res. vol. 30, (1997) pp. 330-337.

Mack, et al., "The Action of Urease in the Decomposition of Urea", British Library—The World's knowledge—www.bl.uk.

Faou, et al., "Thiosulfate, polythionates and elemental sulfur assimilation and reduction in the bacterial world", FEMS Microbiology Reviews, vol. 75 (1990): pp 351-382.

Goos, et al., "Effect of Ammonium Thiosulfate and Dicyandiamide on Residual Ammonium in Fertilizer Bands", Commun. Soil. Sci. Plant. Anal., vol. 23, (1992): pp. 1105-1117.

Janzen, et al., "Influence of Thiosulfate on Nitrification of Ammonium in Soil", Soil Sci. Soc. Am. J., vol. 50, (1986): pp. 803-806.

Goos, et al., "Ammonium Thiosulphate as a Possible Nitrification and Urease Inhibitor", Sulphur in Agriculture, vol. 10, (1986): pp. 2-5.

Saad, et al., "Influence of thiosulfate on nitrification, denitrification, and production of nitric oxide and nitrous oxide in soil", Biol Fertil Soils, vol. 21, (1996): pp. 152-159.

Goos, et al., "Effect of Ammonium Thiosulfate and Liquid Fertilizer Droplet Size on Urea Hydrolysis", Soil Sci. Soc. Am. J., vol. 52, (1988): pp. 522-524.

Fairlie, et al., "Urea Hydrolysis and Ammonia Volatilization Characteristics of Liquid Fertilizer Mixtures II. Studies Under Modified Field Conditions", Journal of Fertilizer Issues, vol. 3, Jul.-Sep. 1986: pp. 86-90.

Sullivan, et al., "Soil and Environmental Effects on Urease Inhibition by Ammonium Thiosulfate", Soil Sci. Soc. Am. J., vol. 56, May-Jun. 1992: pp. 950-956.

"Urease Inhibition Patents",file://C:\Documents%20and%20-Settings\wfisher\Desktop\UREAS#%20INHIBITION%20, Nerac Inc., www.nerac.com/documents: pp. 1-116.

* cited by examiner

CALCIUM POLYSULFIDE, POTASSIUM POLYSULFIDE, CALCIUM THIOSULFATE, AND MAGNESIUM THIOSULFATE AS UREASE INHIBITORS

FIELD OF THE INVENTION

The present invention is directed to improving the efficiency of urea and urea-containing fertilizers. In particular, the invention is directed to use of urease inhibitors in combination with urea-containing fertilizer to significantly reduce potential losses of nitrogen due to ammonia volatilization.

DESCRIPTION OF RELATED ART

Urea, a white crystalline solid containing 46% nitrogen, is widely used in the agricultural industry as a nitrogen fertilizer. World urea production is estimated to have exceeded 83 million tons in 2002-2003 and have a worth of $13.3 billion. Commercially, fertilizer urea can be purchased as prills or as a granulated material. Urea can be applied to soil as a solid or as an aqueous solution. Aqueous urea solution also can be applied to certain crops as a foliar spray. Urea's high nitrogen content (46%) helps reduce handling, storage and transportation costs over other dry nitrogen forms. Urea, when properly applied, results in crop yield increases equal to other forms of nitrogen fertilizer.

Urea contains the highest N content of granular fertilizers, uses the least energy and creates the least pollution during manufacture, and is the least expensive dry N fertilizer. Traditionally, use of urea was not recommended for untilled soil surfaces. However, the stability of urea is receiving greater attention due to a major increase in no-tillage or minimum tillage crop production. In no- or minimum-tillage crop production, fertilizer materials are placed on the soil surface, as opposed to placement in the soil for conventional seedbed operations. Also, improved stability of urea has major nitrogen efficiency implications for the turf industry, where fertilizer products are placed on the soil and turf surface.

Nitrogen from urea can be lost to the atmosphere if fertilizer urea remains on the soil surface for extended periods of time during warm weather. Urea breakdown can begin as soon as it is applied to the soil. Typically, urea does not break down if the soil is totally dry. However, in the presence of the enzyme urease and a small amount of soil moisture, urea normally hydrolyzes to ammonia and carbon dioxide. This can occur in 2 to 4 days; more quickly on high pH soil and at higher temperature.

Urease, a nickel-dependent metalloenzyme, catalyzes the hydrolysis of urea to ammonia and carbamate. The carbamate then spontaneously hydrolyzes to form carbonic acid and a second molecule of ammonia. At physiological pH, the carbonic acid proton dissociates and the ammonia molecules equilibrate with water, becoming protonated and resulting in a net increase in pH.

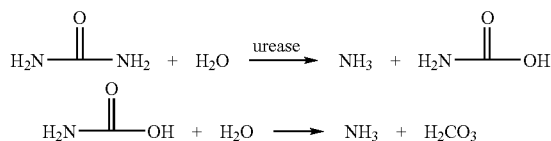

The rate of catalyzed hydrolysis is $10^{14}$ times the rate of the un-catalyzed reaction. Nickel-dependant ureases are found in a wide array of different organisms; many have been isolated from various bacteria, fungi, and higher plants.

The metalloenzyme urease catalyzes the hydrolysis of urea to ammonia and carbamate. The X-ray crystallographic studies of the enzyme reveal the active site is composed of the dinickel center separated by 3.5 Å. The two nickel ions are bridged by a carboxylate group of a carbamylated lysine residue and one water molecule or hydroxide ion. The geometry around one nickel ion [Ni(1)] is best described as distorted square pyramidal with further coordination of two histidine residues from the protein and one terminally coordinated water molecule; the position is only partially occupied by a water molecule and considered to be a likely candidate for binding urea in the catalysis. One terminally coordinated water molecule, one additionally ligated aspartate residue and two histidine residues complete the coordination spheres of the second nickel ion [Ni(2)], resulting in a pseudooctahedral geometry for Ni(2). The nickel centers are in the stable diamagnetic Ni(II) state; thus the role of Ni in urease may be essentially catalytic without necessarily involving redox chemistry (Mack, E. and Villars, D. S., *J. Am. Chem. Soc.*, 45, 505-510, 1923; Karplus, P. A., Pearson, M. A., and Hausinger, R. P., *Acc. Chem. Res.*, 30, 330-337, 1997).

Upon hydrolysis under basic conditions, urea is converted to ammonium carbonate $[(NH_4)_2CO_3]$. Ammonium carbonate is unstable and decomposes to $NH_3$, water, and $CO_2$. When urea hydrolysis takes place on the soil surface, $NH_3$ can escape into the atmosphere. Such escape into the atmosphere is called ammonia volatilization. This type of nitrogen fertilizer loss does not occur if urea or urea-containing materials are placed below the soil surface, as in typical seed bed operations. Direct placement of urea below the soil surface is the most secure way to prevent nitrogen loss by way of ammonia volatilization. Nitrogen losses also are minimized if rainfall occurs soon after a surface application or if overhead irrigation water is applied.

When placed in the soil environment, ammonia further undergoes the following reaction:

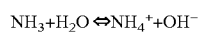

$$NH_3 + H_2O \Leftrightarrow NH_4^+ + OH^-$$

Many crops prefer nitrate rather than ammonium. Once ammonium is formed, volatilization losses are not a factor and the nitrogen can be utilized for crop growth directly or be converted to nitrate nitrogen by soil microorganisms. This conversion occurs rapidly in the presence of bacteria and may lead to an excess of nitrate nitrogen in the soil environment. In order to prevent this rapid conversion, nitrification inhibitors have been developed to inhibit bacterial activity. For example, *Nitrosomas* bacteria in the soil transform ammonia into nitrite anion $(NO_2^-)$ that in turn is oxidized to form a nitrate $(NO_3^-)$ anion by *Nitrobacter* and *Nitrosolobus* bacteria, as follows:

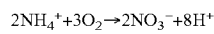

$$2NH_4^+ + 3O_2 \rightarrow 2NO_3^- + 8H^+$$

The nitrification rate is most rapid in soils with pH values between 7 and 8, and decreases with decreasing pH values.

Urease inhibitors prevent or depress the transformation of amide nitrogen in urea to ammonia. They slow down the rate of hydrolysis of urea and reduce the volatilization of ammonia. Nitrification inhibitors delay the oxidation of ammonia by depressing the activity of the soil bacteria responsible for nitrification.

Numerous products have been promoted as nitrification inhibitors and urease inhibitors. For example, dicyandiamide (DCD) and 2-chloro-6-(trichloromethyl)-pyridine (nitrapyrin) are but two examples of nitrification inhibitors.

Similarly, many compounds, including organic compounds, inorganic materials, metal ions, organophosphorus compounds, and agriculture chemicals, have been tested as soil urease inhibitors. (Bock, B. R. and D. E. Kissel, Ammonia Volatilization from Urea Fertilizers. Bulletin Y-206, National Fertilizer Development Center, TVA, Muscle Shoals, Ala. 1988). For example, urease inhibition in urea based fertilizer by phosphorus compounds is described in EP 119 494, EP 0 119 495, EP 0 119 487, WO/02/083697, WO/97/022568, U.S. Pat. Nos. 5,883,297; 5,698,003; 4,824, 783, 4,696,693; 4,676,822; 4,629,491; 4,624,695; 4,618,691; 4,540,428; 4,539,037; 4,537,614; 4,530,714; 4,518,413; 4,517,007, 4,517,004; 4,517,003; 4,517,002; 4,932,992, and 4,242,325.

A commercially successful urease inhibitor preferably is (1) environmentally and toxicologically safe under a reasonable set of handling conditions, (2) nonphytotoxic, (3) highly active and specific for the urease enzyme, (4) cost effective, (5) nonvolatile and compatible with a wide range of fertilizer materials, and (6) has a mobility similar to that of urea. N-(n-butyl)-thiophosphoric triamide (NBPT) and 3,4-dimethylpyrazolphosphate (DMPP) are but two examples of urease inhibitors. NBPT is commercially available under the trademark Agrotain® from Agrotain International, St. Louis, Mo. and is believed to be the only urease inhibitor now commercially available in the United States.

The thiosulfate ion, $S_2O_3^{2-}$, is a structural analogue of $SO_4^{2-}$ ion in which one oxygen atom is replaced by one S atom. However, the two sulfur atoms in thiosulfate are not equivalent. One of the S atoms is a sulfide-like atom that gives the thiosulfate its reducing properties and complexing abilities. The other S atom is in an oxidation state of +6, and behaves like a sulfate.

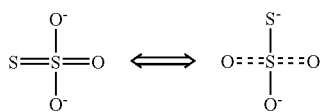

Thiosulfates readily oxidize to dithionate, then to tetrathionate, and finally to sulfates, in accordance with the following sequence:

This transformation makes thiosulfates useful as fertilizers especially in combination with cations such as ammonium, potassium, calcium, and magnesium.

Thiosulfate is an important intermediate in microbial sulfur cycling in soils and sediments (LeFaou, A., Rajagopal, B. S., Fauque, G., FEMS Microbial Review, 75, 351-382, 1990). It has been suggested (Sullivan, D. M., Havlin, J. L., Soil Sci. Soc. Am. J., 56, 957-960, 1992) that tetrathionate might be the actual inhibitor of soil urease by reacting with —SH groups in jack bean urease to form an S-sulpho derivative, as follows:

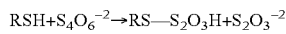

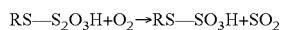

Ammonium thiosulfate (ATS) has been used in conjunction with urea and urea-containing fertilizer products for the purpose of reducing nitrogen loss. For example, it has been suggested that addition of ATS to a urea ammonium nitrate fertilizer solution (UAN) can slow the urea hydrolysis rates after application to soil (Sullivan, D. M., and Havlin, J. L., Soil Sci. Soc. Am. J., 56, 957-960, 1992). ATS oxidizes to the tetrathionate, and the tetrathionate and minerals, such as Mn in the soil, slow urea hydrolysis. Slowing the rate of urea hydrolysis usually reduces the rate of ammonia volatilization (Sullivan, D. M., and Havlin, J. L., ibid, 56, 950-956, 1992).

However, the urease inhibition activity of ammonium thiosulfate is not observed in all circumstances. For example, ATS was ineffective when applied on a vegetable mulch, wheat stubble, or crop residue (Goos, R. J., 1987. Proceedings of the 17th N. Central Extension Industry Soil Fertility Workshop, Oct. 28-29, 1987). This might be due to the mechanism of urease inhibition, which may require the presence of certain metal cations. Potassium thiosulfate (KTS) did not show urease inhibition.

Also, incubation studies at 25° C. with William loam (typical Agriboroll) illustrated that the thiosulfate ion inhibits nitrification (Goos, R. J. ibid, 49, 233-235, 1985). A separate study illustrated that inclusion of 5 vol. percent of a commercial grade liquid ATS to UAN inhibited nitrification by 51% in a 28 day incubation (Goos, R. J., ibid, 49, 233-235, 1985). Addition of ATS and APP (ammonium polyphosphate) to a liquid fertilizer mixture with UAN reduced ammonium loses (Fairlie, T. J., and Goos, R. J., J. Fertilizer Issues, 3, 86-90, 1986).

The effects of soil water content (field capacity and wilting point), liquid fertilizer droplet size, and ATS addition to UAN on urea hydrolysis on two soils (Loamy Sand and Vertic Haplaquolls) were studied by Goos and Fairlie (Fairlie, T. J., and Goos, R. J., Soil. Sci. Soc. Am. J., 52, 522-524(1988). With ATS addition, urea hydrolysis was slower at the wilting point than the field capacity on both soils. Increasing the fertilizer droplet size further slowed the UAN hydrolysis.

The combination of ammonium polysulfide (APS) with UAN was found to have no effect on nitrification, whereas the combination of UAN and ammonium polyphosphate (APP) showed only a weak effect. However, ATS significantly slowed nitrification of UAN (Goos, R. J., Voss, R. P., and Fairlie, T. J., Sulfur in Agriculture, 10, 2-5, 1986).

Application of thiosulfate to soil inhibits soil nitrification. (Saad, O. A. L. O, Lehmann, S, and Conrad, R, Biol Fertil Soils, 21, 152-159, 1996). However, the concentration of $NO_3^-$ is not reduced. Thiosulfate was degraded in the soils tested, under both aerobic and anaerobic conditions. Tetrathionate intermediate is formed, but eventually depleted. This result was in agreement with the suggestion by Janzen and Bettany (Janzen, H. H., and Bettany, J. R., Soil Sci. Soc. Am. J., 50, 803-806, 1986) that tetrathionate, rather than thiosulfate, may be the effective nitrification inhibitor. It also confirmed that the accumulation of $NO_2^-$ probably was caused by inhibition of oxidation.

Application of ATS to soil is less effective than application of dicyandiamide (DCD) in preventing nitrification of banded urea solution or UAN (Goos, R. J., and Johnson, B. E., Commun. Soil Sci. Plant Anal., 23, 1105-1117, 1992). However, ammonia volatilization from urea and urea/ATS mixtures with soil showed that ATS is not an effective urease inhibitor. Rather, reduction of ammonia loss from urea/ATS mixtures, as compared with urea alone, appeared to be primarily from dilution of the urea and some pH buffering from the nonvolatile neutral pH nitrogen source (ATS), the acidity that ATS can form after application to the soil, and the increase in exchangeable calcium (Kissel, D. E., Qafoku, N., Cabrera, M., University of Georgia, 1999).

Ca and Mg nitrates and chlorides reduce ammonia volatilization from soils after surface application of urea. Sulfates of these alkaline earth metals were only slightly effective at reducing ammonia volatilization. This reduction in ammonia volatilization was a result of two effects: (1) precipitation of $CO_3^{2-}$ by $Ca^{++}$ thus preventing the formation of volatile ammonium carbonate, and (2) calcium depression of soil pH by depression of the dissociation of the $CaCO_3/Ca(OH)_2$ buffer systems (Fenn, L. B., Taylor, R. M., and Matocha, J. E., Soil Sci. Soc. Am. J., 45, 776-781, 1981).

The decrease in exchangeable and soluble calcium and magnesium caused by precipitation of $CaCO_3$ and $MgCO_3$ relates to the decrease in loss of ammonia from nitrogen applied to soil (Fenn, L. B., Miyamoto, S., Soil Sci. Soc. Am. J., 45, 537-540, 1981).

Exchangeable Ca within the soil reacts with ammonium carbonate $[(NH_4)_2CO_3]$ produced by urea hydrolysis to form calcium carbonate $(CaCO_3)$. Ammonium carbonate may temporarily raise the soil pH to above 9 in both acid and calcareous soils. Reaction of soluble Ca in the soil solution can suppress the ammonium carbonate-induced increase in pH. Precipitation of $CaCO_3$ allows ammonium cation to non-competitively occupy the exchange sites vacated by calcium ions. Ammonium attached to an exchange site is protected against loss by volatilization. Addition of soluble salts of calcium to urea can reduce the ammonia volatilization by as much as 90%.

The effect of soil pH on ammonia volatilization is minimal at low soil pH (about 3.5), but increases rapidly with increasing pH up to 8.5 (He, Z. L., Alva, A. K., Calvert, D. V., and Banks, D. J., Soil Science, 164, 750-758, 1999). Urease also catalyzes the following reaction:

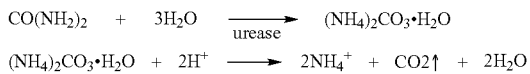

In the presence of calcium salts, calcium carbonate is precipitated as follows:

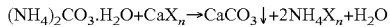

In acid soils, initial pH values in the presence of Ca may be too low for $CaCO_3$ precipitation. Initial urea hydrolysis therefore will occur in a strong acid environment. $CaCO_3$ precipitation occurs only if pH has increased above 7.

Calcium carbonate precipitation and resultant soil pH depression reduce the rate of hydrolysis of added urea and, therefore, reduce ammonia loss (Fenn, L. B., Matocha, J. E., and Wu, E. Soil Sci. Soc. Am. J., 45, 1129-1131, 1981).

On the other hand, at high pH and in the absence of calcium salt:

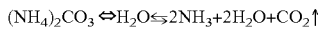

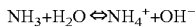

In soils with pH greater than 7, the equilibrium shifts to the left due to higher OH concentrations, and gaseous ammonia is formed and lost by diffusion into the atmosphere.

It has been theorized that calcium ion may react with ammonium carbonate formed by hydrolysis of urea upon urease enzyme catalysis to precipitate calcium ammonium carbonate (Fenn, L. B., Taylor, R. M., & Matocha, J. E., *Soil Sci. Soc Am Journal, id.*) according to the following pathways:

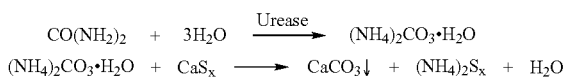

Calcium chloride mixed with urea-containing fertilizer delays the start of ammonia volatilization following fertilizer application and reduces the maximum nitrogen loss rate (Sloan, J. J., Anderson, W. B., Commun. Soil Sci. Plant Anal., 26, 1995).

Leaching of nitrate into groundwater has drawn the attention of public health officials. Therefore, reduction of the nitrification rate is desirable. Nitrification of ammonia to nitrate introduces nitrate into the soil, from which the nitrate then leaches into vicinal groundwater.

Known techniques for improving nitrogen-delivery efficiency of urea fertilizers by reducing loss of nitrogen due to ammonia volatility do not reduce nitrification rate. Therefore, there remains a need for a method for improving efficiency of nitrogen delivery for urea fertilizers that minimizes the production of volatile nitrogen-containing moieties such as ammonia and reduces the nitrification rate.

A device for a slow-release fertilizer based on ammonium for low nitrate plant feeding comprising a hollow body with an opening is described in EP 0 356 755. The hollow body is filled with the ammonium fertilizer.

Agents for improving the nitrogen utilization of mineral and/or organic fertilizers that contain urea is described in EP 1 183 220. These agents comprised alkyl, aryl, and aralkylamino compounds.

European patent number 0 476 550 describes a soil additive ball for the nitrate-free supply of nitrogen to plants consisting of gypsum to slow down volatilization of urea.

Polymer coatings for controlled fertilizer release are described in EP 0 357 687; WO/89/003,811; U.S. Pat. Nos. 6,262,183; and 5,435,821.

Sulfur coated urea fertilizer is described in U.S. Pat. Nos. 5,599,374; 4,676,821; 6,475,259; 5,653,782; 5,478,375; 5,423,897; 5,300,135; U.S. H1085; U.S. Pat. No. 4,481,308.

Urea fertilizers containing urease inhibitor comprising metal nitrate are described in GB 2 285 803.

Use of coating, binding and sealant material such as palm oil for urea fertilizer is described in GB 2 164 640.

Castor oil and oils derived from plants are described as urease and nitrification inhibitors of nitrogenous fertilizers in U.S. Pat. Nos. 6,315,807 and 4,932,991.

Urease inhibitor consisting of hydroxy thiol compound is described in JP 11/000,165.

Use of hetrocyclic compounds as urease inhibitors is described in WO/00/061,522 and U.S. Pat. No. 4,954,156.

Boric acid or its salt is used as an antagonistic inhibitor to urease with urea fertilizer in JP 59/151,900 and U.S. Pat. No. 4,462,819.

Thus, although many techniques are successful at reducing ammonia volatility, there exists a continuing need for a method of increasing the nitrogen efficiency of surface- and foliar-applied urea fertilizer by reducing the nitrogen-releasing adverse effects of urease. That is, there exists a need for a method of increasing the nitrogen-delivering efficiency of urea-containing fertilizer by inhibiting urease catalysis of the hydrolysis of urea to ammonia and ammonium carbonate, which also is converted to ammonia.

DETAILED DESCRIPTION OF THE INVENTION

The invention is directed to a method for increasing the nitrogen-delivery efficiency of surface- and foliar-applied urea-containing fertilizer by inhibiting the catalytic action of urease on the hydrolysis of urea to form volatile ammonia. In particular, the invention is directed to a method for inhibiting the catalytic effect of urease by application of a urease-inhibiting amount of calcium polysulfide, potassium polysulfide, calcium thiosulfate, magnesium thiosulfate, or a blend thereof, together with or shortly after application of a urea-containing fertilizer. The invention also reduces the volatility of any ammonia or ammonium ion that forms.

The inventors have discovered that calcium polysulfide, potassium polysulfide, calcium thiosulfate, magnesium thiosulfate, and blends thereof, in quantities set forth below, are effective in inhibiting the catalytic effect of urease on the hydrolysis of urea to ammonia. Therefore, these compounds are effective in increasing the nitrogen delivery, or utilization, rate of urea-containing fertilizer by inhibiting the catalytic effect of urease and by reducing the volatility of ammonia and ammonium ions. Whereas use of calcium thiosulfate and magnesium thiosulfate as fertilizer is known, the inventors have discovered that use of these compounds, calcium polysulfide, potassium polysulfide, and blends thereof, in combination with urea-containing fertilizer is effective in inhibiting urease-catalyzed hydrolysis. This discovery is unexpected and surprising in view of the fact that ammonium thiosulfate has been shown not to inhibit urease activity. Also, the presence of thiosulfate ions provides the additional benefit of inhibiting nitrification.

In accordance with the method of the invention, a urease-inhibiting amount of calcium polysulfide, potassium polysulfide, calcium thiosulfate, magnesium thiosulfate, or a blend thereof, is applied shortly before, with, or shortly after application of a urea-containing fertilizer. The urease-inhibiting amount of these compounds is significantly less than the amount of, for example, calcium thiosulfate or magnesium thiosulfate used as fertilizer.

In accordance with the method of the invention, between about 1 and 10 pounds of calcium polysulfide, potassium polysulfide, calcium thiosulfate, magnesium thiosulfate, or a blend thereof, is applied per 100 pounds of urea to the soil to be fertilized, or to the foliage of plants to be fertilized. Preferably, between about 2.5 and about 10 pounds, and more preferably between about 5 and about 10 pounds of calcium polysulfide, potassium polysulfide, calcium thiosulfate, magnesium thiosulfate, or a blend thereof, is applied per 100 pounds of urea.

The urease-inhibiting compound, or blend of compounds, can be applied shortly before, with, or shortly after, application of the urea-containing fertilizer. The urease-inhibiting compound can be applied at any time in relation to the application of a urea-containing fertilizer, so long as urea and the urease-inhibiting compound remain undegraded or unused. Urease-inhibiting compound is applied shortly before, with, or after application of urea-containing fertilizer because the compound preferably is in direct contact with the urea. Skilled practitioners recognize that the longer the period between application of urea-containing fertilizer and application of the urease-inhibiting compound in accordance with the method of the invention, the less effective the method of the invention will be at increasing nitrogen delivery efficiency. Longer periods between application of urea and application of urease inhibiting compound yields greater degradation of urea by urease, resulting in lower delivery efficiency. Preferably, therefore, the urease-inhibiting compound is applied simultaneously with or immediately before or after application of the urea-containing fertilizer. Most preferably, the urease-inhibiting compound is administered simultaneously with the urea-containing fertilizer.

The method of the invention is suitably used with any urea-containing fertilizer. Skilled practitioners recognize that such fertilizers may be in the form of a solid, such as prill or granules, or in aqueous solution. Any such urea-containing fertilizer can be effectively treated in accordance with the method of the invention.

Skilled practitioners recognize that calcium polysulfide, calcium thiosulfate, potassium polysulfide, and magnesium thiosulfate are solids that are freely soluble in water. Aqueous solutions of these compounds are available commercially. For example, calcium polysulfide is available as a 28-29 wt percent aqueous solution under the tradename CaPS® from Tessenderlo Kerley, Inc. Similarly, calcium thiosulfate is available as a 24 wt percent aqueous solution under the tradename CaTs® from Tessenderlo Kerley, Inc., potassium polysulfide is available as a 30 wt percent aqueous solution under the tradename K-Sul® from Tessenderlo Kerley Inc., and magnesium thiosulfate is available as a 22-23 wt percent aqueous solution under the tradename MagThio®, also from Tessenderlo Kerley, Inc.

Thus, it is possible to practice preferred embodiments of the invention by applying a homogenous solid mixture or an aqueous solution of fertilizer and urease inhibitor. Homogenous solid mixtures and aqueous solutions are convenient ways of ensuring that urea fertilizer and urease inhibitor are applied simultaneously. Homogenous solid mixtures of urea with any of the urease inhibitors can be made simply by blending urea prill, or any solid form of urea, with solid urease inhibitor or blends thereof. Similarly, aqueous solutions of urea with calcium polysulfide, calcium thiosulfate, potassium polysulfide, magnesium thiosulfate, or blends thereof, also are conveniently made for use in accordance with a preferred embodiment of the invention.

The following examples illustrate the invention.

EXAMPLE 1

Example 1 illustrates the ability of four additive compounds to reduce ammonia volatilization from soil-applied urea. The four compounds are liquid calcium thiosulfate (CaTs®), potassium thiosulfate (KTS®), ammonium thiosulfate (Thio-Sul®), and calcium polysulfide (all available from Tessenderlo Kerley Inc.) The liquids have the following concentrations in aqueous solutions: calcium thiosulfate, CaTs® 24 wt percent; potassium thiosulfate, KTS® 50 wt percent; ammonium thiosulfate, ATS 59 wt percent; and calcium polysulfide, CaPS® 28-29 wt percent.

The amount of additive compound set forth in Table 1 below was added to a solution of reagent grade urea having a urea concentration of 13850 micrograms of nitrogen per 2 ml, together with the desired amount of compound. This urea concentration was selected to be equivalent to an application rate of 100 lbs of nitrogen per acre. A standard sample containing only urea in the same concentration and an unfertilized blank (2 ml of distilled water) also were applied to soil.

The amounts of additive compound were calculated to provide the desired quantity of that compound appropriate for application of a 50 percent w/v solution of urea (i.e., 50 grams of urea per 100 ml of water) to supply 100 lbs of nitrogen per acre. Each additive compound was used at 5 and 10 percent of the volume of urea solution. The treatments were therefore equivalent to the application 198 liters (52.3 US gallons) of urea solution per acre together with 9.9 liters (2.6 US gallons) of additive compound at the low rate or 19.8 liters (5.2 US Gallons) at the high rate.

Soil was treated and ammonia measurements were taken in accordance with the following method. Plastic containers with a diameter of 4.2 cm were used for this study. Each container was filled with 60 g of a sandy soil and moistened with 12 mls water to 86% of its water holding capacity. All treatments were surface applied in 2 mls of solution, bringing the moisture level up to field capacity.

The containers were sealed with an air-tight cover and continuously purged at a rate of 400 cm$^3$ per minute, the minimum air flow rate that produced reproducible results. The air was humidified before introduction by bubbling it through distilled water, then passing it through a cotton plug to remove moisture droplets. Evolved ammonia was collected by passing the air through 50 mls of 0.5 M sulfuric acid. This was sufficient to collect 3 times the total amount of nitrogen added, ensuring that the solution never became saturated with ammonia. The amounts of ammonia collected in the sulfuric acid solutions were determined by the indophenol blue method.

Ammonia measurements were taken at 2 and 7 days after application. Each treatment was replicated; the values in Table 1 represent the average of values observed. The amounts of ammonia collected are expressed as a percentage of the total that was applied.

TABLE 1

|  | % Loss | | | Reduction in |
| --- | --- | --- | --- | --- |
|  | 0–2 days | 3–7 days | Total | Loss (%) |
| CaTs ®, 5% | 15.9 | 0.5 | 16.4 | 36.6 |
| KTS ®, 5% | 22.7 | 2.6 | 25.3 | 2.1 |
| Thio-Sul ®, 5% | 17.6 | 2.0 | 19.6 | 24.4 |
| CaPS ®, 5% | 2.8 | 3.6 | 6.4 | 75.2 |
| CaTs ®, 10% | 16.3 | 3.5 | 19.8 | 23.4 |
| KTS ®, 10% | 22.7 | 3.0 | 25.7 | 0.6 |
| Thio-Sul ®, 10% | 13.2 | 4.1 | 17.3 | 33.1 |
| CaPS ®, 10% | 4.0 | 2.7 | 6.7 | 74.2 |
| Blank | 0.0 | 0.0 | 0.0 |  |
| Urea only | 22.0 | 3.9 | 25.9 |  |

These results indicate that KTS had no significant effect on ammonia volatilization. All other products reduced ammonia loss, with calcium polysulfide being most effective.

EXAMPLE 2

Ammonia volatilization is a pH dependent process, with less volatilization at lower pH values. Therefore, four additive compounds were considered to determine whether these compounds reduce volatilization by acidifying the soil.

The pH values of the eight solutions of urea and additive compound, the blank, and the urea-only solutions prepared and used in Example 1 were determined before the start of the experiment and the soil pH values were determined at the end of a 7 day period. The results are as follows:

TABLE 2

| Treatment | | Solution pH | Soil pH |
| --- | --- | --- | --- |
| 1 | CaTs ®, 5% | 7.1 | 7.6 |
| 2 | KTS ®, 5% | 7.2 | 7.7 |
| 3 | Thio-Sul ®, 5% | 7.7 | 7.6 |
| 4 | CaPS ®, 5% | 10.5 | 7.5 |
| 5 | CaTs ®, 10% | 7.4 | 7.5 |
| 6 | KTS ®, 10% | 7.2 | 7.6 |
| 7 | Thio-Sul ®, 10% | 7.7 | 7.5 |
| 8 | CaPS ®, 10% | 10.8 | 7.5 |
| 9 | Blank |  | 7.3 |
| 10 | Urea standard | 8.4 | 7.6 |

As can be seen in the data, calcium polysulfide increased solution pH. Therefore, calcium polysulfide would have been expected to increase ammonia volatilization, because increased pH typically results in increased ammonia volatility. However, calcium polysulfide was the most effective in reducing volatilization. The other three compounds raised the pH of the solution slightly. Because potassium thiosulfate raised the solution pH the smallest amount, it would have been expected to be most effective against ammonia volatilization, considering only the pH of the solution. However, potassium thiosulfate was the least effective compound against ammonia volatilization.

The ability of a given compound to inhibit volatilization was not related to the effect of the compound on solution pH. No compound had any noticeable effect on soil pH. The effects of these additive compounds on volatilization therefore were not due to soil acidification but to the inhibition of urease activity.

EXAMPLE 3

The effectiveness of calcium polysulfide as a urease inhibitor and ammonium volatilization inhibitor was compared with the effectiveness of potassium polysulfide to illustrate the role of calcium in urease inhibition with soil-applied urea. The two products were liquids: calcium polysulfide (CaPS) and potassium polysulfide (K-Sul®, available from Tessenderlo Kerley Inc.). The solution concentrations are 28 wt percent and 30 wt percent respectively.

The amount of additive compound set forth in Table 3 below was added to a solution of reagent grade urea having a urea concentration of 13850 micrograms of nitrogen per 2 ml, together with the desired amount of compound. This urea concentration was selected to be equivalent to an application rate of 100 lbs of nitrogen per acre. A standard sample containing only urea in the same concentration and an unfertilized blank (2 ml of distilled water) also were applied to soil.

The amounts of additive compound were calculated to provide the desired quantity of that compound appropriate for application of a 50 percent w/v solution of urea (i.e., 50 grams of urea per 100 ml of water) to supply 100 lbs of nitrogen per acre. The urea and additive compounds were applied to soil in accordance with the method described in Example 1.

Calcium polysulfide solution was added at a rate of 1, 2, 4 and 8 percent of the volume of urea solution. K-Sul® was added at a rate of 5 and 10 percent of the volume of urea solution. Ammonia measurements were taken at 2 and 7 days after application. Each treatment was replicated; the values in Table 3 represent the average values of the data observed. The amounts of ammonia collected are expressed as a percentage of the total that was applied.

TABLE 3

|  | % lost | | | Reduction in |
| --- | --- | --- | --- | --- |
|  | 0–2 days | 3–7 days | Total | Loss (%) |
| CaPS ®, 1% | 22.79 | 9.27 | 32.06 | 13.37 |
| CaPS ®, 2% | 18.96 | 8.47 | 27.43 | 25.89 |
| CaPS ®, 4% | 16.82 | 4.53 | 21.35 | 42.31 |
| CaPS ®, 8% | 9.26 | 7.19 | 16.46 | 55.53 |
| K-Sul ®, 5% | 18.72 | 6.86 | 25.58 | 30.89 |
| K-Sul ®, 10% | 12.89 | 9.47 | 22.36 | 39.61 |
| Standard | 25.56 | 11.45 | 37.01 |  |
| Blank | 0.00 | 0.00 | 0.00 |  |

These results indicate that both products reduced ammonia loss with the CaPS being more effective. Volatilization is reduced by the urease-inhibiting compounds. The effectiveness of both products increased with its concentration.

EXAMPLE 4

Because ammonia volatilization is a pH dependent process, with less volatilization at lower pH values, the two additive compounds of Example 3 were considered to determine whether these compounds reduce volatilization by acidifying the soil. The compounds were applied to soil in accordance with the method described in Example 1.

The pH values of the six solutions of urea and additive compound, the blank, and the urea-only solutions prepared and used in Example 3 were determined before the start of the experiment and the soil pH values were determined at the end of the 7 day period. The results are as follows:

TABLE 4

|  | Solution pH | Soil pH |
|---|---|---|
| CaPS ®, 1% | 9.9 | 7.4 |
| CaPS ®, 2% | 10.0 | 7.5 |
| CaPS ®, 4% | 10.4 | 7.3 |
| CaPS ®, 8% | 10.6 | 7.3 |
| K-Sul ® 5% | 11.1 | 7.3 |
| K-Sul ®, 10% | 11.4 | 7.3 |
| Blank |  | 6.7 |
| Urea standard | 9.0 | 7.5 |

Both materials increased solution pH and therefore would have been expected to increase volatilization. However, both products were effective in reducing volatilization, thus indicating urease inhibition.

Inhibition of volatilization was not related to the effect of the products on solution or soil pH. The effect of these products on volatilization is therefore not due to soil acidification but to the inhibition of urease activity.

In both studies, calcium polysulfide was a more effective agent in urease inhibition and ammonia volatilization than the thiosulfate products (calcium thiosulfate and potassium thiosulfate). It was also a better urease inhibitor, when it was compared to another polysulfide, i.e., potassium polysulfide (K-Sul®).

Although calcium polysulfide increases solution pH and therefore would have been expected to increase the volatilization, this product was most effective. Although the inventors do not wish to be bound by theory, the ability of calcium polysulfide to form a complex with the nickel ion in urease, a nickel-containing enzyme, may inhibit the urease activity.

Decreases in exchangeable and soluble calcium precipitated as $CaCO_3$ is related to the drop in ammonia losses in applied nitrogen (Fenn, et. al., 1981). Although the applicants do not wish to be bound by theory, these relationships might be a cause of the effectiveness of calcium polysulfide in inhibiting urease activity.

By comparison, ammonium polysulfide, which contains an ammonium ion ($NH_4^+$) instead of calcium ion ($Ca^{2+}$), showed less urease inhibition activity than calcium polysulfide.

Calcium thiosulfate was more effective than potassium thiosulfate in urease inhibition and ammonia volatilization inhibition, but less effective than calcium polysulfide. Calcium thiosulfate showed more activity than ammonium polysulfide.

EXAMPLE 5

The following treatments were carried out to compare the effectiveness of calcium and magnesium moieties in calcium thiosulfate (CaTs®) and Magnesium Thiosulfate (MagThio®) (both trademarks of Tessenderlo Kerley, Inc.).

In each treatment, the appropriate amount of product was added to a solution of reagent grade urea and made to 100 mls in volumetric flasks. Concentrations were adjusted to ensure that the 2 mls of each solution provided 13850 micrograms of nitrogen together with the required amount of product to provide the equivalent of an application rate of 100 lbs of nitrogen per acre. A standard sample contained only urea and an unfertilized blank was treated with 2 mls of distilled water.

The product rates were equivalent to application of a 50% w/v solution of urea to supply 100 lbs of nitrogen per acre. The CaTs® product was added at a rate of 2.5, 5, and 10 percent of the volume of urea solution. The MagThio® product was added at a rate of 5, and 10 percent of the volume of urea solution.

The urea solution and either CaTs® or MagThio® were applied to soil in accordance with the method described in Example 1. Ammonia measurements were taken at 2 and 7 days after application. Each treatment was replicated three times.

The results of the trials are presented in Table 5 below. The amounts of ammonia collected are expressed as percentage of the total nitrogen that was applied.

TABLE 5

|  | % lost | | | Reduction in |
|---|---|---|---|---|
|  | 0–2 days | 3–7 days | Total | Loss (%) |
| CaTs ® (2.5) | 22.90 | 8.80 | 31.70 | 6.07 |
| CaTs ® (5) | 20.50 | 7.20 | 27.70 | 17.93 |
| CaTs ® (10) | 15.80 | 5.65 | 21.45 | 36.44 |
| MagThio ® (5) | 22.60 | 8.00 | 30.60 | 9.33 |
| MagThio ® (10) | 19.40 | 5.60 | 25.00 | 25.93 |
| Urea | 25.50 | 8.25 | 33.75 |  |
| Blank | 0.00 | 0.00 | 0.00 |  |

These results indicate that both products reduced ammonia loss, with CaTs® being more effective. As expected, the effectiveness of both products increased with concentration.

Skilled practitioners recognize that the continuous purge technique used in Examples 1-5 substantially increases the rate of ammonia loss. Therefore, the data neither predict nor reflect the quantity of ammonia that might be lost in the field. However, the data does illustrate the effectiveness of the method of the invention at reducing ammonia loss.

Skilled practitioners also recognize that the test method for examples 1-5 is suitable for products applied as liquids, but would not be suitable for products applied as a solid. For example, a larger surface area is required to ensure that the quantities of materials used yield reproducible results. Further, liquid urea solution is immediately available to urease degradation, whereas solid urea likely dissolves over a period. These considerations were applied and illustrated in Example 6.

EXAMPLE 6

Example 6 illustrates the effectiveness at reducing ammonia loss of homogenous solid mixtures of urea fertilizer with urease inhibitor. Each test container was 14 cm in diameter. Six hundred grams of sandy soil moistened to 85 percent water holding capacity were placed around a small vial. The resultant soil depth was 2 inches.

The small vial in the soil contained 5 mls. of 1 M sulfuric acid to collect volatile ammonia. The quantity of acid was sufficient to collect 50 percent of the nitrogen applied to the soil.

The homogenous solid mixtures described in Table 6 were applied to the soil in an amount equivalent to 100 or 200 lbs. nitrogen per acre. An unfertilized blank also was prepared. Each application was carried out three times; the data set forth in Table 6 is the average of the three runs.

TABLE 6

| Product | Description | % N |
|---------|-------------|------|
| A | Urea | 46.6 |
| B | Urea + 2.31 wt % CaTs ® | 45.6 |
| C | Urea + 3.26 wt % CaTs ® | 44.2 |
| D | Urea + 7.82 wt % CaTs ® | 42.3 |
| E | Urea + 3.26 wt % MagThio ® | 44.7 |
| F | Urea + CaPS ® | 34.4 |
| G | Blank | |

The homogenous solid mixtures were applied and the containers were sealed for seven days. At the end of that period the acid was removed from each container and quantitatively analyzed to determine the quantity of nitrogen (ammonia) collected. The result of those analyses is set forth in Table 6. Another aliquot of acid was put in place in the vial in the soil and the container was again sealed. This technique was repeated until no ammonia was collected in the acid. As shown in Table 7, no nitrogen was collected during the fourth seven-day period, and the test was terminated.

TABLE 7

| | | Ammonia collected, mg Day | | | | | | | |
|---|---|---|---|---|---|---|---|---|---|
| Material | lbs N per ac | 2 | 7 | 14 | 21 | 28 | Total | % of N applied | % reduction |
| A | 100 | 0.14 | 2.32 | 0.78 | 0.00 | 0.00 | 3.25 | 2.07 | |
| A | 200 | 0.31 | 4.86 | 4.31 | 0.47 | 0.00 | 9.94 | 3.17 | |
| B | 100 | 0.13 | 1.37 | 0.93 | 0.00 | 0.00 | 2.42 | 1.54 | 25.6 |
| B | 200 | 0.18 | 3.30 | 1.15 | 0.00 | 0.00 | 4.63 | 1.48 | 53.3 |
| C | 100 | 0.13 | 1.82 | 1.02 | 0.01 | 0.00 | 2.97 | 1.90 | 8.4 |
| C | 200 | 0.29 | 4.02 | 4.11 | 0.37 | 0.00 | 8.80 | 2.80 | 11.5 |
| D | 100 | 0.10 | 1.28 | 0.19 | 0.00 | 0.00 | 1.57 | 1.00 | 51.8 |
| D | 200 | 0.38 | 4.54 | 3.89 | 0.38 | 0.00 | 9.19 | 2.93 | 7.6 |
| E | 100 | 0.12 | 1.51 | 0.91 | 0.00 | 0.00 | 2.54 | 1.62 | 21.7 |
| E | 200 | 0.32 | 3.91 | 4.04 | 0.41 | 0.00 | 8.68 | 2.77 | 12.6 |
| F | 100 | 0.13 | 2.27 | 0.23 | 0.00 | 0.00 | 2.63 | 1.68 | 18.8 |
| F | 200 | 0.44 | 4.39 | 3.77 | 0.27 | 0.00 | 8.87 | 2.83 | 10.7 |
| G | 0 | 0.00 | 0.00 | 0.00 | 0.00 | 0.00 | 0.00 | | |

As can be seen from the data in Table 7, CaTs®, MagThio®, and CaPS® were effective in reducing ammonia volatilization. Although the amount of N lost was small and the losses occurred over a longer period than the liquid examples, the effectiveness of the urease inhibitors was clearly shown. For example, CaTs® was more effective at higher concentration than at lower concentration when the N concentration was low, whereas at higher N concentration, the lowest CaTs® concentration was more effective. However, at both N addition rates, the effectiveness of the products did not increase with increasing CaTs® addition rate.

Thus, Example 6 demonstrates that solid urease inhibitor is effective in reducing nitrogen loss from solid urea. The proportions of nitrogen lost during the test period were much smaller for the solid urea and urease inhibitors than for liquid urea and urease inhibitors. As described herein, such a result is expected.

Because the loss of nitrogen was relatively low, some of the results were anomalous. For example, for some urease inhibitors, percent nitrogen loss reduction was greater at higher nitrogen concentration, but for other inhibitors, the reverse was true. Further, the test of CaTs® at 3.26 wt % used different soil from the tests at 2.31 wt % and 7.82 wt %. Therefore, these results are not directly comparable to each other or to the results of Examples 1-5. However, data in Table 7 illustrates the effectiveness of urease inhibitor of the invention.

These Examples are directed to selected embodiments of the invention and do not limit the scope of the invention, which is limited only by the scope of the claims. For example, blends of urease inhibitors with urea, or other concentrations of urease inhibitors, are within the scope of the invention.

What is claimed is:

1. A method for inhibiting urease activity on urea-containing fertilizer applied to soil or foliage comprising applying to the soil or foliage a urease-inhibiting quantity of a compound selected from the group consisting of calcium polysulfide, potassium polysulfide, calcium thiosulfate, magnesium thiosulfate, and blends thereof, wherein the compound is applied simultaneously with, before or after the urea-containing fertilizer is applied to the soil or foliage such that the compound is in direct contact with urea in the urea-containing fertilizer.

2. The method of claim 1 wherein the urea-containing fertilizer is in aqueous solution with the urease-inhibiting compound.

3. The method of claim 2 wherein the solution is applied to foliage.

4. The method of claim 1 wherein the urea-containing fertilizer is in homogeneous solid mixture with the urease-inhibiting compound.

5. The method of claim 1 wherein the quantity of urease-inhibiting compound is between about 1 and about 10 pounds per 100 pounds urea.

6. The method of claim 1 wherein the quantity of urease-inhibiting compound is between about 2.5 and about 10 pounds per 100 pounds urea.

7. The method of claim 1 wherein the quantity of urease-inhibiting compound is between about 5 and about 10 pounds per 100 pounds urea.

8. A method for inhibiting urease-catalyzed conversion of urea-containing fertilizer applied to soil or foliage to ammonia comprising applying to the soil or foliage a urease-inhibiting quantity of a compound selected from the group consisting of calcium polysulfide, potassium polysulfide, calcium thiosulfate, magnesium thiosulfate, and blends thereof, wherein the compound is applied simultaneously with, before or after the urea-containing fertilizer is applied to the soil or foliage such that the compound is in direct contact with urea in the urea-containing fertilizer.

9. The method of claim 8 wherein the urea-containing fertilizer is in aqueous solution with the urease-inhibiting compound.

10. The method of claim 8 wherein the urea-containing fertilizer is in homogeneous solid mixture with the urease-inhibiting compound.

11. The method of claim 8 wherein the quantity of urease-inhibiting compound is between about 1 and about 10 pounds per 100 pounds urea.

12. The method of claim 8 wherein the quantity of urease-inhibiting compound is between about 2.5 and about 10 pounds per 100 pounds urea.

13. The method of claim 8 wherein the quantity of urease-inhibiting compound is between about 5 and about 10 pounds per 100 pounds urea.

14. A method of reducing nitrogen loss from urea-containing fertilizer applied to soil or foliage comprising applying to the soil or foliage a urease-inhibiting quantity of a compound selected from the group consisting of calcium polysulfide, potassium polysulfide, calcium thiosulfate, magnesium thiosulfate, and blends thereof, wherein the compound is applied simultaneously with, before or after the urea-containing fertilizer is applied to the soil or foliage such that the compound is in direct contact with urea in the urea-containing fertilizer.

15. The method of claim 14 wherein the urea-containing fertilizer is in aqueous solution with the urease-inhibiting compound.

16. The method of claim 15 wherein the aqueous solution is applied to foliage.

17. The method of claim 14 wherein the urea-containing fertilizer is in homogeneous solid mixture with the urease-inhibiting compound.

18. The method of claim 14 wherein the quantity of urease-inhibiting compound is between about 1 and about 10 pounds per 100 pounds urea.

19. The method of claim 14 wherein the quantity of urease-inhibiting compound is between about 2.5 and about 10 pounds per 100 pounds urea.

20. The method of claim 14 wherein the quantity of urease-inhibiting compound is between about 5 and about 10 pounds per 100 pounds urea.

* * * * *